3,149,907
REMOVAL OF NITRIC OXIDE FROM GAS MIXTURES CONTAINING THE SAME

Ernst Karwat, Pullach im Isartal, Germany, assignor to Gesellschaft für Linde's Eismaschinen Aktiengesellschaft, Hollriegelskreuth, near Munich, Germany, a German company
No Drawing. Original application Aug. 11, 1958, Ser. No. 754,143, now Patent No. 3,023,076, dated Feb. 27, 1962. Divided and this application July 17, 1961, Ser. No. 124,330
Claims priority, application Germany Sept. 3, 1957
3 Claims. (Cl. 23—2)

This invention relates to the art of gas purification, and is particularly concerned with the problem of removing nitric oxide from gas mixtures containing the same. In its specific application the invention consists in a process for removing nitric oxide present in low concentration in a coke oven gas or similar gas mixture containing gaseous oxidizable compounds.

This application is a division of my co-pending application Serial No. 754,143, filed August 11, 1958, now Patent No. 3,023,076.

Nitric oxide and dienes (for example, cyclopentadiene) form polymerizable nitrosates and nitrosites, which make trouble in city gas, gas meters, valves and pipe lines, or which as spontaneously flammable resins are the cause of explosions in the decomposition of coke oven gas by low-temperature cooling. Nitric oxide in flue gas hinders the recovery of carbon dioxide from flue gas by low-temperature washing, since it starts the decomposition of the washing agent trichloroethylene. Nitric oxide in the recovered carbon dioxide makes the latter unusable for application in the blasting of steel in converters, because it remains in the steel as nitrogen. Nitric oxide which enters, from air contaminated with it, into the water circuit of a hydraulic washing plant, or which is formed by the action of bacteria in the water circuit of the hydraulic washing plant, is transferred during the washing to the washed gas, for example, a NO-free converted gas, and jeopardizes the subsequent decomposition of the low-temperature gas.

For washing nitric oxide from gas mixtures, such as coke oven gas, it has been suggested to use aqueous solutions of salts of lower oxides of sulphur or chromates and bichromates, respectively. However, their action is incomplete and they have therefore, not found application in the industry.

The object of the present application is to provide a method of operation whereby the nitric oxide is removed completely and economically from mixed gases containing low concentrations of NO-gas, such as coke oven gas, generator gas and flue gas. It is characterized in that the NO-containing gas mixture to be purified is washed with an aqueous solution of sodium chlorite, $NaClO_2$.

Solutions of chlorous acid $HClO_2$ in water, to be used according to the invention, remove nitric oxide from the gas mixture conducted through it better than any other washing agent that has become known for the removal of NO. The best form of application of this solution is when it has a pH between 7 and 12, which condition can be easily standardized to the desired value by the addition of OH-ions in the solution of technical sodium chlorite—particularly to the commercial form of the salt which has a low caustic soda content. In order to maintain this alkalinity, the sodium chlorite washing stage—in the purification of coke oven gas or converted gas, which is to be decomposed by low-temperature cooling—is shifted behind the working stages for removing the carbon dioxide: pressure water washing and lye washing. For example, 10,000 $Nm.^3/h$. coke oven gas, compressed to 12 atm. abs. and freed from carbon dioxide, which still contains 1 part per million NO, is washed—in a wash tower filled with Raschig rings—with 20 to 50 cubic meters per hour of a 1 to 10% (by weight) aqueous solution of $NaClO_2$, at pH 9. NO can no longer be detected in the washed gas. The washing agent is circulated by a circulation pump between the base and head of the wash tower. Another wash tower of the same type as the first one serves to ensure the purity of the gas washed when the wash liquor of the first tower is almost exhausted. When the washing power of the first tower has been spent, the second wash tower is connected as the first tower and the first one connected as the second tower, after replacing the washing agent by a fresh solution. The expression $Nm.^3$ as used herein means one cubic meter of gas measured at 0° C. and 760 mm. Hg.

If a gas mixture having a high carbon dioxide content, like flue gas, for example, which may contain 50 parts per million (p.p.m.) NO, is to be liberated of nitric oxide for the eventual extraction of carbon dioxide, it is washed with an aqueous acidified $NaClO_2$ solution whose pH value is between 6 and 3, preferably 4.5, after which the washed gas contains no more NO.

The penetration of NO into gases subject to hydraulic washing for the purpose of $CO_2$ removal was discussed hereinbefore. According to the invention the nitric oxide, penetrating the water, e.g., during aeration with NO-containing air can be destroyed even in the water itself. For this purpose, the water is treated with $NaClO_2$ until the dissolved NO has vanished. The end point of the addition is visible in that the gas passing through the water so treated does not yield NO any longer to a gas conducted through it.

I claim:
1. A process for removing NO from a gas mixture containing NO up to about 50 parts per million of NO which consists in washing the gas mixture with an aqueous solution of $NaClO_2$.
2. A process as defined in claim 1 in which the pH of the aqueous solution of $NaClO_2$ is maintained at from 7 to 12.
3. A process as defined in claim 1 in which the pH of the aqueous solution of $NaClO_2$ is maintained at from 3 to 6.

References Cited in the file of this patent
UNITED STATES PATENTS
1,339,494    Burdick _____ May 11, 1920

OTHER REFERENCES
Mellor: "A Comprehensive Treatise on Inorganic and Theoretical Chemistry," Longmans, Green and Company, New York, N.Y., vol. 8, 1928, page 433.